US012129319B2

(12) United States Patent
Thompson

(10) Patent No.: US 12,129,319 B2
(45) Date of Patent: Oct. 29, 2024

(54) PROCESS FOR THE PRODUCTION OF ISOOLEFIN POLYMERS USING A TERTIARY ETHER

(71) Applicant: ARLANXEO Singapore Pte. Ltd., Singapore (SG)

(72) Inventor: David Thompson, Sarnia (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 636 days.

(21) Appl. No.: 17/311,857

(22) PCT Filed: Dec. 16, 2019

(86) PCT No.: PCT/CA2019/051818
§ 371 (c)(1),
(2) Date: Jun. 8, 2021

(87) PCT Pub. No.: WO2020/124212
PCT Pub. Date: Jun. 25, 2020

(65) Prior Publication Data
US 2022/0017655 A1    Jan. 20, 2022

(30) Foreign Application Priority Data
Dec. 17, 2018 (EP) .................... 18213138

(51) Int. Cl.
C08F 2/14      (2006.01)
C08F 4/14      (2006.01)
C08F 210/12    (2006.01)
C08F 236/08    (2006.01)

(52) U.S. Cl.
CPC .............. C08F 2/14 (2013.01); C08F 4/14 (2013.01); C08F 210/12 (2013.01); C08F 236/08 (2013.01); C08F 2500/03 (2013.01)

(58) Field of Classification Search
CPC .................... C08F 2/14; C08F 4/14
USPC ................................ 526/209, 237
See application file for complete search history.

(56) References Cited

U.S. PATENT DOCUMENTS

| | | | |
|---|---|---|---|
| 2,637,751 A | 5/1953 | Brooks et al. | |
| 2,944,578 A | 7/1960 | Baldwin et al. | |
| 2,948,709 A | 8/1960 | Kuntz et al. | |
| 2,964,493 A | 12/1960 | Hakala et al. | |
| 3,018,275 A | 1/1962 | Cottle | |
| 3,278,467 A | 10/1966 | Burke et al. | |
| 3,932,370 A | 1/1976 | Landi et al. | |
| 3,960,988 A | 6/1976 | Kent | |
| 4,245,060 A | 1/1981 | Powers | |
| 4,405,760 A | 9/1983 | Howard, Jr. et al. | |
| 4,501,859 A | 2/1985 | Newman | |
| 5,066,730 A | 11/1991 | Kennedy et al. | |
| 5,408,018 A | 4/1995 | Rath | |
| 5,569,723 A | 10/1996 | Baade et al. | |
| 5,670,582 A | 9/1997 | Chung et al. | |
| 5,674,955 A | 10/1997 | Kerr et al. | |
| 5,681,901 A | 10/1997 | Newman | |
| 5,886,106 A | 3/1999 | Sumner et al. | |
| 6,672,350 B2* | 1/2004 | Sandstrom ............ B60C 1/0016 152/905 |
| 7,001,966 B2 | 2/2006 | Lang et al. | |
| 9,644,041 B2 | 9/2017 | Groemping et al. | |
| 2006/0079655 A1* | 4/2006 | Chung ................ C08F 212/08 525/240 |
| 2008/0227922 A1 | 9/2008 | Rath et al. | |
| 2013/0131281 A1 | 5/2013 | Gronowski et al. | |
| 2014/0309362 A1 | 10/2014 | Leiberich et al. | |
| 2016/0312021 A1 | 10/2016 | Thompson et al. | |
| 2022/0017651 A1 | 1/2022 | Davidson et al. | |
| 2022/0017658 A1 | 1/2022 | Murray | |
| 2022/0017659 A1 | 1/2022 | Murray | |
| 2022/0025084 A1 | 1/2022 | Murray | |

FOREIGN PATENT DOCUMENTS

| | | |
|---|---|---|
| CA | 1265891 A | 2/1990 |
| CA | 2787228 A1 | 7/2011 |
| CA | 2836521 A1 | 11/2012 |
| CA | 2934725 A1 | 7/2015 |
| CN | 1120049 A | 4/1996 |
| CN | 1738843 A | 2/2006 |
| CN | 1753918 A | 3/2006 |
| CN | 106536571 A | 3/2017 |
| EP | 0265053 A | 4/1988 |
| EP | 0646103 B1 | 8/1997 |
| EP | 1215240 A1 | 6/2002 |
| EP | 1479724 A1 | 11/2004 |
| EP | 2966097 A1 | 11/2015 |
| GB | 839270 A | 6/1960 |

(Continued)

OTHER PUBLICATIONS

Co-pending U.S. Appl. No. 17/299,508, filed Jun. 3, 2021. (Published as US 2022/0025084).
Co-pending U.S. Appl. No. 17/299,608, filed Jun. 3, 2021. (Published as US 2022/0017658).
Co-pending U.S. Appl. No. 17/311,267, filed Jun. 4, 2021. (Published as US 2022/0017659).
Co-pending U.S. Appl. No. 17/311,297, filed Jun. 4, 2021. (Published as US 2022/0017651 A1).
International Search Report and Written Opinion, PCT Application No. PCT/CA2019/051834 dated Jun. 25, 2020.
International Search Report and Written Opinion, PCT Application No. PCT/CA2019/051835 dated Mar. 3, 2020.
International Search Report and Written Opinion, PCT Application No. PCT/CA2019/051836 dated Feb. 18, 2020.
International Search Report and Written Opinion, PCT Application No. PCT/CA2019/051799 dated Feb. 28, 2020.

(Continued)

Primary Examiner — Fred M Teskin
(74) Attorney, Agent, or Firm — The Dobrusin Law Firm, P.C.

(57) ABSTRACT

The invention relates to an efficient process for the preparation of isoolefin polymers such as polyisobutene or butyl rubber by polymerization of isobutene and optionally further monomers in the presence of an initiator system comprising at least one boron or aluminium compound and at least one tertiary alkyl ether.

20 Claims, No Drawings

(56) References Cited

FOREIGN PATENT DOCUMENTS

| | | | |
|---|---|---|---|
| JP | 64-062308 A | 3/1989 | |
| JP | H0297509 A | 4/1990 | |
| JP | 07-501044 A | 2/1995 | |
| JP | 07-268033 A | 10/1995 | |
| WO | 98/003562 A1 | 1/1998 | |
| WO | 2010/006983 A1 | 1/2010 | |
| WO | 2011/089091 A1 | 7/2011 | |
| WO | 2011/089092 A1 | 7/2011 | |
| WO | 2013/011017 A1 | 1/2013 | |
| WO | 2015/095961 A1 | 7/2015 | |
| WO | 2015/164964 A | 11/2015 | |
| WO | 2015/164965 A | 11/2015 | |
| WO | 2016/149802 A | 9/2016 | |

OTHER PUBLICATIONS

International Search Report and Written Opinion, PCT Application No. PCT/CA2019/051818 dated Mar. 19, 2020.

Rubber Technology, 3rd Ed., Edited by Maurice Morton, Kluwer Academic Publishers, pp. 297-300 or United States Patent U.S. Pat. No. 5,886,106 issued Mar. 23, 1999.

Shiman, D.I. et al., "Cationic Polymerization of Isobutylene by AlCl3/Ether Complexes in Non-Polar Solvents: Effect of Ether Structure on the Selectivity of β-H Elimination". Polymer, Feb. 27, 2013, vol. 54 (9), pp. 2235-2242, ISSN 0032-3861. Section 3.1.2; Table 2.

Vasilenko, I.V. et al., "Cationic Polymeriztion of Isobutylene in Toluene:toward Well-Defined Exo-Olefin Terminated Medium Molecular Weight Polyisobutylenes under Mild Conditions". Polymer Chemistry, Jan. 23, 2017, vol. 8 (8), pp. 1417-1425, ISSN 1759-9962. p. 1422, right-hand side colume; Supplemental Information document, Table S3.

Kaszas, Bromination of Butyl Rubber in The Presence of Electrophilic Solvents and Oxidizing Agents, Rubber Chemistry and Technology, American Chemical Society, Rubber Division, vol. 73, No. 2, May 2000, pp. 356-365.

Extended European Search Report for EP Patent Application 19900382.3 (related to U.S. Appl. No. 17/311,267), mailed on Dec. 14, 2022.

Extended European Search Report dated Dec. 9, 2022, Application No. 19900153.8/3898714.

Extended European Search Report dated Dec. 13, 2022, Application No. 19901228.7/3898716.

Extended European Search Report dated Dec. 2, 2022, Application No. 19905971.8/3902845.

Extended European Search Report dated Oct. 13, 2022, Application No. 19899056.6/3898712.

Elias, Hans-Georg: "Makromolekule—Band 3: Industrielle Polymere und Syntheses", Wiley VCH, vol. 6, p. 175 (Broken up into 6 parts due to size) May 2, 2010.

Mishra Munmaya K et al.: "Living Carbocationic Polymerization. VII. Living Polymerization of Isobutylene by Tertiary Alkyl (Or Aryl) Methyl Ether/Boron Trichloride Complexes", Journal of Macromolecular Science: Part A—Chemis, Marcel Dekker, New York, NY, US, vol. A24, No. 8, 1987, pp. 933-948, XP009156751, ISSN: 0022-233X, DOI: 10.1080/00222338708076927 (Broken up into 2 parts due to size).

First Chinese Search, CN Application No. 2019800829824 dated Oct. 19, 2022.

First Chinese Office Action, CN Application No. 2019800829824 dated Oct. 19, 2022.

Second Chinese Office Action, CN Application No. 2019800829824 dated Dec. 19, 2023.

\* cited by examiner

PROCESS FOR THE PRODUCTION OF ISOOLEFIN POLYMERS USING A TERTIARY ETHER

CLAIM OF PRIORITY

This application is a national phase filing under 35 USC § 371 from PCT Patent Application serial number PCT/CA2019/051818 filed on Dec. 16, 2019 and published as WO 2020/0124212 A1 on Jun. 25, 2020, which claims priority to European Patent Application Number EP 18213138.3 filed on Dec. 17, 2018. PCT Patent Application serial number PCT/CA2019/051818 and European Patent Application Number EP 18213138.3 are each incorporated by reference herein in its entirety.

FIELD OF THE INVENTION

The invention relates to an efficient process for the preparation of isoolefin polymers such as polyisobutene or butyl rubber by polymerization of isobutene and optionally further monomers in the presence of an initiator system comprising at least one boron or aluminium compound and at least one secondary or tertiary alkyl ether.

BACKGROUND

Polymers containing repeating units derived from isoolefins are industrially prepared by carbocationic polymerization processes. Of particular importance are polyisobutene and butyl rubber which is a copolymer of isobutylene and a smaller amount of a multiolefin such as isoprene.

The carbocationic polymerization of isoolefins and its copolymerization with multiolefins is mechanistically complex. The initiator system is typically composed of two components: an initiator and a Lewis acid such as aluminum trichloride which is frequently employed in large scale commercial processes.

Examples of initiators include proton sources such as hydrogen halides, alcohols, phenols, carboxylic and sulfonic acids and water.

During the initiation step, the isoolefin reacts with the Lewis acid and the initiator to produce a carbenium ion which further reacts with a monomer forming a new carbenium ion in the so-called propagation step.

The type of monomers, the type of diluent or solvent and its polarity, the polymerization temperature as well as the specific combination of Lewis acid and initiator affects the chemistry of propagation and thus monomer incorporation into the growing polymer chain.

Industry has generally accepted widespread use of a slurry polymerization process to produce polyisobutylene, butyl rubber and further isoolefin polymers in methyl chloride as diluent. Typically, the polymerization process is carried out at low temperatures, generally lower than −90° ° C. Alkyl chlorides, in particular methyl chloride are employed for a variety of reasons, including that it dissolves the monomers and aluminum chloride initiator but not the polymer product. Methyl chloride also has suitable freezing and boiling points to permit, respectively, low temperature polymerization and effective separation from the polymer and unreacted monomers. The slurry polymerization process in methyl chloride offers the advantage that a polymer concentration of up to 40 wt.-% and more in the reaction mixture can be achieved, as opposed to a polymer concentration of typically at technically feasible maximum 20 wt.-% in solution polymerizations depending on the targeted molecular weight. An acceptable relatively low viscosity of the polymerization solution has to be maintained enabling the heat of polymerization to be removed via heat exchange across the surface of the reaction device. Slurry and solution polymerization processes in methyl chloride or alkanes are used in the production of high molecular weight polyisobutylene and isobutylene-isoprene butyl rubber polymers.

Alternatively, aliphatic solvents like normal and iso pentanes and hexanes as well as mixtures are used for polymerization as for examples disclosed in WO2010/006983A and WO2011/089092A which have significant advantages in the downstream processing e.g. chemical modification of the polymer.

The isoolefin polymer e.g. polyisobutene or butyl rubber prepared during polymerization is dissolved in these aliphatic media and so these processes are normally referred to as a solution processes.

A common feature of both, slurry and solution processes is that due to the high reactivity of the initiators employed temperature control and the avoidance of so called "hot spots" due to inhomogenities of the polymerization medium is difficult but crucial to achieve a desired product quality and to avoid reactor fouling, i.e. the formation of deposits of polymers on the surfaces of the reactor. Such deposits, due to their insulating effect, reduce cooling efficiency and may cause a rapid rise of temperature within the reactor thereby increasing the rate of the exothermic polymerization and fast production of further heat which is again insufficiently removed. Finally, this may even lead to a thermal runaway.

Several attempts have been made in the past either to support external or internal cooling with the aim to maintain a desired (low) temperature within a reactor.

Other attempts have been made by replacing commonly used aluminum and boron initiators by other less reactive initiators or by modifying them by bulky fluorinated substituents to allow for a more evenly distributed heat generation during polymerization. However these attempts were not economically feasible.

Therefore, there still remained a need for providing a versatile process for the preparation of high quality isoolefin polymers with superior process control

SUMMARY OF THE INVENTION

According to one aspect of the invention, there is now provided a process for the preparation of isoolefin polymers, the process comprising at least the step of:
a) providing a reaction medium comprising an organic diluent, at least one monomer being an isoolefin and an initiator system comprising
   at least one boron or aluminium compound and
   at least one tertiary ether
and
b) polymerizing the at least one monomer within the reaction medium in the presence of the initiator system to form a product medium comprising the isoolefin polymer, the organic diluent and optionally residual monomer(s).

DETAILED DESCRIPTION OF THE INVENTION

The invention also encompasses all combinations preferred embodiments, ranges parameters as disclosed hereinafter with either each other or with the broadest disclosed range or parameter.

Isoolefins and Other Monomers

In step a) a reaction medium comprising an organic diluent, at least one monomer being an isoolefin and an initiator system is provided.

As used herein the term isoolefin denotes compounds comprising one carbon-carbon-double-bond, wherein one carbon-atom of the double-bond is substituted by two alkyl-groups and the other carbon atom is substituted by two hydrogen atoms or by one hydrogen atom and one alkyl-group.

Examples of suitable isoolefins include isoolefins having from 4 to 16 carbon atoms, preferably 4 to 7 carbon atoms, such as isobutene, 2-methyl-1-butene, 3-methyl-1-butene, 2-methyl-2-butene. A preferred isolefin is isobutene.

The reaction medium may comprise further monomers that are copolymerized with the at least one isoolefin. Such further monomers include multiolefins.

As used herein the term multiolefin denotes compounds comprising more than one carbon-carbon-double-bond, either conjugated or non-conjugated.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The reaction medium may additionally or alternatively comprise further monomers that are copolymerized with the at least one isoolefin and are neither isoolefins nor multiolefins. Such further monomers include β-pinene, styrene, divinylbenzene, diisopropenylbenzene o-, m- and p-alkyl-styrenes such as o-, m- and p-methyl-styrene.

In one embodiment isobutene is used as sole monomer, whereby the term "sole" as used herein denotes a fraction of 99.9 wt.-% or more of all monomers employed.

In another embodiment, the monomers employed in step a) may comprise in the range of from 80 wt.-% to 99.5 wt.-%, preferably of from 85 wt.-% to 98.0 wt.-%, more preferably of from 85 wt.-% to 96.5 wt.-%, even more preferably of from 85 wt.-% to 95.0 wt.-%, by weight of at least one isoolefin and in the range of from 0.5 wt.-% to 20 wt.-%, preferably of from 2.0 wt.-% to 15 wt.-%, more preferably of from 3.5 wt.-% to 15 wt.-%, and yet even more preferably of from 5.0 wt.-% to 15 wt.-% by weight of at least one multiolefin based on the weight sum of all monomers employed.

In another embodiment the monomer mixture comprises in the range of from 90 wt.-% to 95 wt.-% of at least one isoolefin and in the range of from 5 wt.-% to 10 wt.-% by weight of a multiolefin based on the weight sum of all monomers employed. Yet more preferably, the monomer mixture comprises in the range of from 92 wt.-% to 94 wt.-% of at least one isoolefin and in the range of from 6 wt.-% to 8 wt.-% by weight of at least one multiolefin monomer based on the weight sum of all monomers employed. The isoolefin is preferably isobutene and the multiolefin is preferably isoprene.

Where at least one multiolefin is employed in the reaction medium the multiolefin content of the final copolymers produced are typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

In another embodiment the multiolefin content of copolymers produced according to the invention is 0.1 mol-% or more, preferably of from 0.1 mol-% to 3 mol-%, particularly where isobutene and isoprene are employed.

In one embodiment the monomers are purified before use in step a), in particular when they are recycled from optional step c). Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis.

Organic Diluents

The term organic diluent encompasses diluting or dissolving organic chemicals which are liquid under reactions conditions. Any suitable organic diluent may be used which does not or not to any appreciable extent react with monomers or components of the initiator system.

However, those skilled in the art are aware that interactions between the diluent and monomers or components of the initiator system.

Additionally, the term organic diluent includes mixtures of at least two diluents.

Examples of organic diluents include hydrochlorocarbon(s) such as methyl chloride, methylene chloride or ethyl chloride.

Further examples of organic diluents include hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

In one embodiment the hydrofluorocarbon(s) is/are selected from the group consisting of saturated hydrofluorocarbons such as fluoromethane; difluoromethane; trifluoromethane; fluoroethane; 1,1-difluoroethane; 1,2-difluoroethane; 1,1,1-trifluoroethane; 1,1,2-trifluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3- tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane;

Particularly preferred HFC's include difluoromethane, trifluoromethane, 1,1-difluoroethane, 1,1,1-trifluoroethane, fluoromethane, and 1,1,1,2-tetrafluoroethane.

In one further embodiment the hydrofluorocarbon(s) is/are selected from the group consisting of unsaturated hydrofluorocarbons such as vinyl fluoride; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 2,3,3,3-tetrafluoro-1-propene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-bexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1, 1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,3,4,4-hexafluoro-2-butene; 1,1,1,4,4,4-hexafluoro-2-butene; 1,1,2,3,4,4-hexafluoro-2-butene; 1, 1,1,2,3,4,4-heptafluoro-2-butene; 1,1,1,2,4,4,4-heptafluoro-2-butene; and mixtures thereof.

Further examples of organic diluents include hydrochlorofluorocarbons.

Further examples of organic diluents include hydrocarbons, preferably alkanes which in a further preferred embodiment are those selected from the group consisting of n-butane, isobutane, n-pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4-trimethylpentane, octane, heptane, butane, nonane, decane, dodecane, undecane, hexane, methyl cyclohexane, cyclopentane, methylcyclopentane, 1,1-dimethylcycopentane, cis-1,2-dimethylcyclopentane, trans-1,2-dimethylcyclopentane, trans-1,3-dimethyl-cyclopentane, ethylcyclopentane, cyclohexane, methylcyclohexane.

Further examples of hydrocarbon diluents include benzene, toluene, xylene, ortho-xylene, para-xylene and meta-xylene.

Suitable organic diluents further include mixtures of at least two compounds selected from the groups of hydrochlorocarbons, hydrofluorocarbons, hydrochlorofluorocarbons and hydrocarbons. Specific combinations include mixtures of hydrochlorocarbons and hydrofluorocarbons such as mixtures of methyl chloride and 1,1,1,2-tetrafluoroethane, in particular those of 40 to 60 vol.-% methyl chloride and 40 to 60 vol.-% 1,1,1,2-tetrafluoroethane whereby the aforementioned two diluents add up to 90 to 100 vol.-%, preferably to 95 to 100 vol. % of the total diluent, whereby the potential remainder to 100 vol. % includes other halogenated hydrocarbons; or mixtures of methyl chloride and at least one alkane or mixtures of alkanes such as mixtures comprising at least 90 wt.-%, preferably 95 wt.-% of alkanes having a boiling point at a pressure of 1013 hPa of −5° C. to 100° C. or in another embodiment 35° C. to 85° C. In another embodiment least 99.9 wt.-%, preferably 100 wt.-% of the alkanes have a boiling point at a pressure of 1013 hPa of 100° C. or less, preferably in the range of from 35 to 100° ° C., more preferably 90° C. or less, even more preferably in the range of from 35 to 90° C.

Depending on the nature of the polymerization intended for step b) the organic diluent is selected to allow a slurry polymerization or a solution polymerization.

Initiator System

The monomer(s) within the reaction medium are polymerized in the presence of an initiator system to form a product medium comprising the isoolefin polymer, the organic diluent and optionally residual monomer(s).

The initiator system comprises
at least one boron or aluminium compound and
at least one tertiary ether
optionally
at least one further activating compound Suitable one boron or aluminium compounds are those represented by formula $MX_3$, where M is boron or aluminum and X is a halogen. Examples for such compounds include aluminum trichloride, aluminum tribromide, boron trifluoride, boron trichloride and boron tribromide, whereby aluminum trichloride is preferred.

Further suitable boron or aluminium compounds are those represented by formula $MR_{(m)}X_{(3-m)}$, where M is boron or aluminum, X is a halogen, R is a monovalent hydrocarbon radical selected from the group consisting of $C_1$-$C_{12}$ alkyl and $C_7$-$C_{14}$ alkylaryl radicals; and m is one or two. The term "alkylaryl" refers to a radical containing both aliphatic and aromatic structures, the radical being at an aliphatic position.

Examples for such compounds include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB).

A particularly preferred aluminum compound is aluminum trichloride.

Ethers

As used herein tertiary ethers are those bearing at least one tertiary alkyl or tertiary arylalkyl group, preferably only one tertiary alkyl or tertiary arylalkylaryl group at the ether oxygen.

Preferred tertiary alkyl groups include tert.-butyl, and tert.-amyl.

Preferred tertiary arylalkylaryl groups include cumyl.

Examples of tertiary alkyl ethers include methyl tert.-butyl ether (MTBE), ethyl tert.-butyl ether (ETBE), methyl tert.-amyl ether (MTAE) and phenyl tert.-butyl ether (PTBE) or mixtures thereof, whereby methyl tert.-butyl ether (MTBE), ethyl tert.-butyl ether (ETBE), methyl tert.-amyl ether (MTAE) or mixtures thereof are preferred and whereby methyl tert.-butyl ether (MTBE) is even more preferred.

Further activating compounds useful in this invention are selected from those being capable of reacting with the chosen boron or aluminum compounds to yield a complex which reacts with the monomers thereby forming a propagating polymer chain.

In a preferred embodiment such activating compounds are selected from the group consisting of water, alcohols, phenols, hydrogen halides, carboxylic acids, carboxylic acid halides, carboxylic acid esters, carboxylic acid amides, sulfonic acids, sulfonic acid halides, alkyl halides, alkylaryl halides and polymeric halides.

Preferred alcohols include methanol, ethanol, propanol, 2-propanol, 2-methylpropan-2-ol, cyclohexanol, and benzyl alcohol.

Preferred phenols include phenol; 2-methylphenol; 2,6-dimethylphenol; p-chlorophenol; p-fluorophenol; 2,3,4,5,6-pentafluorophenol; and 2-hydroxynaphthalene.

Preferred hydrogen halides include hydrogen chloride, hydrogen bromide and hydrogen iodide. A particularly preferred hydrogen halide is hydrogen chloride.

Preferred carboxylic acids include both aliphatic and aromatic carboxylic acids. Examples of carboxylic acids useful in this invention include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid.

Carboxylic acid halides useful in this invention are similar in structure to carboxylic acids with the substitution of a halide for the OH of the acid. The halide may be fluoride, chloride, bromide, or iodide, with the chloride being preferred.

Carboxylic acid halides useful in this invention include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Carboxylic acid esters include methyl acetate, ethyl acetate, vinyl acetate, propyl acetate, allyl acetate, benzyl acetate, methyl acrylate, ethyl acrylate, propyl acrylate, butyl acrylate, methyl methacrylate, ethyl methacrylate, propyl methacrylate, butyl methacrylate, dimethyl maleate, diethyl maleate, dipropyl maleate, methyl benzoate, ethyl benzoate, propyl benzoate, butyl benzoate, allyl benzoate, butylidene benzoate, benzyl benzoate, phenylethyl benzoate, dimethyl phthalate, diethyl phthalate, dipropyl phthalate, dibutyl phthalate, dipentyl phthalate, dihexyl phthalate, diheptyl phthalate and dioctyl phthalate.

Carboxylic acid amides include N,N-dimethyl formamide, N,N-dimethyl acetamide, N,N-diethyl formamide and N,N-diethyl acetamide. Preferred tertiary alkyl and aralkyl initiators include tertiary compounds represented by the formula below: wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably containing 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this invention and any claims thereto, arylalkyl is defined to mean a compound containing both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1,4-bis(1-chloro-1-methylethyl) benzene; 5-tert-butyl-1,3-bis(1-chloro-1-methylethyl) benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl) benzene; 5-tert-butyl-1,3-bis(1-acetoxy-1-methylethyl) benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl) benzene; 5-tert-butyl-1,3-bis(1-methoxy-1-methylethyl) benzene and 1,3,5-tris(1-chloro-1-methylethyl) benzene.

Sulfonic acids useful as initiators in this invention include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this invention are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this invention include methanesulfonyl chloride, methanesulfonyl bromide, trichloromethanesulfonyl chloride, trifluoromethanesulfonyl chloride and p-toluenesulfonyl chloride.

Alkyl halides useful in this invention include 2-chloro-2,4,4-trimethylpentane and 2-chloro-2-methylpropane.

Alkylaryl halides useful in this invention include 1-chloro-1-methylethylbenzene.

Polymeric halides useful in this invention include those having at least two halogenated tertiary carbons positioned at the chain end or along or within the backbone of the polymer.

A preferred molar ratio of tertiary ether to the sum of boron and aluminum atoms of the boron or aluminum compounds employed is generally from 0.001 to 0.500, preferably 0.005 to 0.500 more preferably from 0.001 to 0.200, yet more preferably from 0.002 to 0.200.

The initiator system including the lewis acid and the initiator is preferably present in the reaction mixture in an amount of 0.002 to 5.0 wt.-%, preferably of 0.1 to 0.5 wt.-%, based on the weight of the monomers employed.

In another embodiment, in particular where aluminum trichloride is employed the wt.-ratio of monomers employed to boron or aluminum compounds, in particular aluminum trichloride is within a range of 500 to 20,000, preferably 1,500 to 10,000.

In a particularly preferred initiator system, the boron or aluminum compound is ethyl aluminum sesquichloride, preferably generated by mixing equimolar amounts of diethyl aluminum chloride and ethyl aluminum dichloride, preferably in an organic diluent. The organic diluent is preferably the same one used to perform the polymerization in step b).

The initiator system described above is also encompassed by the invention whether in combination with a organic diluent or not.

In one embodiment water is additionally employed as further activating compound. In this embodiment the amount of water is in the range of 0.1 to 4.0 moles of water per mole of boron or aluminum compound, preferably in the range of 0.2 to 2 moles of water per mole of boron or aluminum compound, most preferably 0.5 to 1 moles of water per mole of boron or aluminum compound, in particular where compounds of formula $MR_{(m)}X_{(3-m)}$ as described above are used. In one embodiment, where aluminum halides, in particular aluminum trichloride are employed as boron or aluminum compound water and/or alcohols, preferably water is used as further activating compound.

The Reaction Medium

The monomer(s) may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-%, or in another embodiment of from 5.0 wt.-% to 55.0 wt.-%.

The organic diluent may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-%, or in another embodiment of from 10.0 wt.-% to 40.0 wt.-%.

The amounts of organic diluent, the monomers and the initiator system are selected such that they make up at least 95 wt.-%, preferably 97 to 100 wt.-% and more preferably 99 to 100 wt. % of the reaction medium employed in step b).

The remainder to 100%, if present, may comprise other organic or inorganic compounds, preferably those virtually not affecting the polymerization reaction.

In one embodiment the reaction medium comprises of from 10.0 wt.-% to 65.0 wt.-% of monomer(s), of from 20.0 wt.-% to 89.9 wt.-% of organic diluent and of from 0.1 wt.-% to 15.0 wt.-% of carbon dioxide whereby the amounts of organic diluent, the monomer(s) and carbon dioxide are selected such that they make up at least 95 wt.-%, preferably 97 to 100 wt.-% and more preferably 99 to 100 wt. % of the reaction medium. From a throughput and efficiency standpoint it is desirable to increase the concentration of the monomers relative to the diluent, which is to say the reacting vs non-reacting fractions of the reaction medium. However, this has the side effect of increasing the thermal load on the reactor, potentially overwhelming its capacity to remove the heat of reaction. In addition to degrading the performance of the reactor, this can lead to undesireable impacts on the product properties, including but not limited to the molecular weight distribution of the polymer.

Polymerization Conditions

In one embodiment, the organic diluent and the monomers employed are substantially free of water. As used herein substantially free of water is defined as less than 30 ppm based upon total weight of the reaction medium, preferably less than 20 ppm, more preferably less than 10 ppm, even more preferably less than 5 ppm, and most preferably less than 1 ppm.

One skilled of the art is aware that the water content in the diluent and the monomers needs to be low to ensure that the initiator system is not affected by additional amounts of water which are not added by purpose e.g. to serve as an initiator.

Steps a) and b) may each be carried out in continuous or batch processes, whereby a continuous operation is preferred. Typically provision of a reaction medium in step a) and initiation of the polymerization in b) are realized simultaneously.

In an embodiment of the invention the polymerization according to step b) is effected using a polymerization reactor. Suitable reactors are those known to the skilled in the art and include flow-through polymerization reactors, plug flow reactor, stirred tank reactors, moving belt or drum reactors, jet or nozzle reactors, tubular reactors, and autorefrigerated boiling-pool reactors. Specific suitable examples are disclosed in WO 2011/000922 A and WO 2012/089823 A.

Depending on the choice of the organic diluent the polymerization according to step b) is carried out either as slurry polymerization or solution polymerization.

In slurry polymerization, the monomers, the initiator system are all typically soluble in the diluent or diluent mixture, i.e., constitute a single phase, while the copolymer upon formation precipitates from the organic diluent. Desirably, reduced or no polymer "swelling" is exhibited as indicated by little or no Tg suppression of the polymer and/or little or no organic diluent mass uptake.

In solution polymerization, the monomers, the initiator system are all typically soluble in the diluent or diluent mixture, i.e., constitute a single phase as is the copolymer formed during polymerization.

The solubilities of the desired polymers in the organic diluents described above as well as their swelling behaviour under reaction conditions is well known to those skilled in the art.

The advantages and disadvantages of solution versus slurry polymerization are exhaustively discussed in the literature and thus are also known to those skilled in the art.

Step b) is preferably carried out as slurry process.

In one embodiment step b) is carried out at a temperature in the range of −100° C. to −60° ° C., preferably in the range of −98° C. to −80° C. and even more preferably in the range of −97° C. to −90° ° C.

The reaction pressure in step b) is typically from 500 to 100,000 hP, preferably from 1100 to 20,000 hPa, more preferably from 1300 to 5,000 hPa.

Where the polymerization according to step b) is carried out as a slurry process the solids content of the slurry in step b) is preferably in the range of from 1 to 45 wt.-%, more preferably 3 to 40 wt.-%, even more preferably 15 to 40 wt.-%.

As used herein the terms "solids content" or "solids level" refer to weight percent of the isoolefin polymer in the product medium comprising the isoolefin polymer, the organic diluent and optionally residual monomer(s) obtained according to step b).

In one embodiment the reaction time in step b) is from 2 min to 2 h, preferably from 10 min to 1 h and more preferably from 20 to 45 min.

The process may be carried out batchwise or continuously. Where a continuous reaction is performed the reaction time given above represents the average residence time.

In one embodiment the reaction is stopped by quenching agents for example a 1 wt.-% sodium hydroxide solution in water, methanol or ethanol.

In another embodiment, the reaction is quenched by the contact with the aqueous medium in step c), which in one embodiment may have a pH value of 5 to 11, preferably 6 to 10 and more preferably 8 to 9 measured at 20° C. and 1013 hPa.

The pH-Adjustment where desired may be performed by addition of acids or alkaline compounds which preferably do not contain multivalent metal ions. pH adjustment to higher pH values is e.g. effected by addition of sodium or potassium hydroxide.

In particular for solution polymerizations the conversion is typically stopped after a monomer consumption of from 5 wt.-% to 25 wt.-%, preferably 10 wt.-% to 20 wt.-% of the initially employed monomers.

Monomer conversion can be tracked by online viscometry or spectroscopic monitoring during the polymerization.

In one embodiment in an optional step c), in particular where step b) was performed as a slurry process, the product medium obtained in step b) is contacted with an aqueous medium and removing at least partially the organic diluent and to the extent present in the medium removing at least partially the residual monomers and carbon dioxide to obtain an aqueous slurry comprising the isoolefin polymer in form of fine particles often referred to as rubber crumb. The contact can be performed in any vessel suitable for this purpose and be carried out batchwise or contiguously, whereby a continuous process is preferred. In industry such contact is typically performed in a steam-stripper, a flash drum or any other vessel known for separation of a liquid phase and vapours.

Removal of organic diluent and optionally monomers may also employ other types of distillation so to subsequently or jointly remove the residual monomers and the organic diluent to the desired extent. Distillation processes to separate liquids of different boiling points are well known in the art and are described in, for example, the *Encyclopedia of Chemical Technology*, Kirk Othmer, 4th Edition, pp. 8-311, which is incorporated herein by reference. Generally, the unreacted monomers and the diluent may either be separately or jointly be recycled into step a) of the process according to the invention.

The pressure in optional step c) and in one embodiment the steam-stripper or flash drum depends on the organic diluent and monomers employed in step b).

The temperature in optional step c) is selected to be sufficient to at least partially remove the organic diluent and to the extent still present residual monomers.

The organic diluent and/or the monomer(s) removed in step c) may be recycled into steps a) and or b) again.

In one embodiment the temperature is from 10 to 100° C., preferably from 50 to 100° C., more preferably from 60 to 95° C. and even more preferably from 75 to 95° C.

In case step b) was carried out as solution polymerization upon contact with water the organic diluent is evaporated and the isoolefin polymer forms discrete particles suspended in the aqueous slurry.

In a further optional step d) the isoolefin polymer contained in the aqueous slurry obtained according to step c) may be separated to obtain the isoolefin polymer.

The separation may be effected by flotation, centrifugation, filtration, dewatering in a dewatering extruder or by any other means known to those skilled in the art for the separation of solids from fluids.

In a further optional step e) the isoolefin polymer particles obtained according to step d) are dried, preferably to a residual content of volatiles of 7,000 or less, preferably 5,000 or less, even more preferably 4,000 or less and in another embodiment 2,000 ppm or less, preferably 1,000 ppm or less.

As used herein the term volatiles denotes compounds having a boiling point of below 250° C., preferably 200° C. or less at standard pressure and include water as well as remaining organic diluents.

Drying can be performed using conventional means known to those in the art, which includes drying on a heated mesh conveyor belt or in an extruder.

Surprisingly it was found that the isoolefin polymers prepared according to the invention in particular where isobutene and isoprene are used as monomers, typically referred to as butyl rubber, exhibit a unique microstructure.

When isoprene is incorporated into the isobutene backbone this incorporation is mainly effected in two different ways and thus leads to two different structures.

One structure is the so-called 1,4-isoprene structure

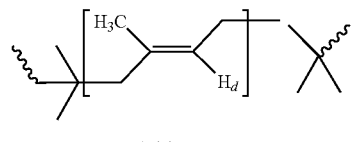

1,4-isoprene

The other one is a branched structure

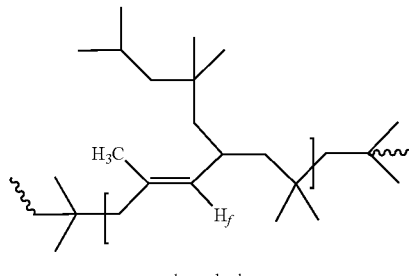

branched

A suitable method to differentiate these structures is Nuclear Magnetic Resonance (NMR) spectroscopy. A proton NMR spectrum contains peaks which can be assigned to each of the above structures. Integration of the area of these peaks gives results which can be converted into mole percent of each of the structures.

A maximum content of 1,4-isoprene is desirable since it allows easier curing of the isoolefin polymer or other chemical modifications such as halogenation to chlorobutyl rubber and bromobutyl rubber.

However the typical molar ratio for the structures 1,4-isoprene to branched of known and commercially available butyl rubbers is from 8.0 to 12.5. Surprisingly said ratio for butyl rubber obtainable according to the process described above is from 14.0 to 20.0, preferably from 14.0 to 17.0 and thus shifted into a more desirable range than currently known.

A further surprising effect of the process according to this invention is that the formation of undesired side products is reduced to a minimum.

Irrespective of whether the polymerization is effected as a slurry or solution process cyclic oligomers 1-isopropenyl-2,2,4,4-tetramethylcyclohexane, hereinafter referred to as C13 and 1,1,5,5-tetramethyl-2-(1-methylethenyl)-3-(2,2,4-trimethylpentyl)-cyclohexane, hereinafter referred to as C21 are produced as by-product and remain within the butyl rubber in amounts of 1000 up to 2500 ppm depending on commercial source.

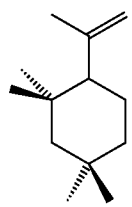

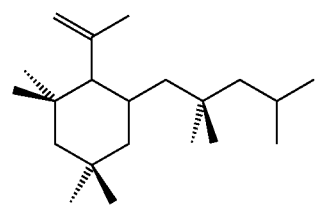

These cyclic oligomers are undesirable in certain applications, for example in pharmaceutical seals, closures, blood collection stoppers, medical devices and food grade applications, due to the potential of such cyclic oligomers to migrate into/onto the pharmaceutical or food product, and then interact or react with the product and/or be introduced into a patient. Therefore, a reduction in cyclic oligomer levels in butyl rubber is highly desirable, in particular where subsequent halogenation is intended since halogenated oligomers, due to their reactivity, are even more of concern.

It was found that the process according to the invention, in particular after performing step c) or optionally also step d) the sum of C13 and C21 within the butyl rubber is typically less than 800 ppm, preferably from 50 to 800 ppm and even more preferably from 200 to 700 ppm.

The content of C13 within the butyl rubber is typically less than 350 ppm, preferably from 20 to 300 ppm and even more preferably from 50 to 300 ppm.

The content of C21 within the butyl rubber is typically less than 450 ppm, preferably from 30 to 450 ppm and even more preferably from 50 to 400 ppm.

The wt-ratio of C21 to C13 within the butyl rubber is typically from 0.9 to 2.0, preferably from 1.2 to 2.0 while this ratio for known butyl rubbers of different commercial sources is typically from 2.3 to 4.0.

Preferred butyl rubbers according to the invention are those already encompassed in the process section above and include c butyl rubbers comprising repeating units derived from isobutene and isoprene.

Typically the butyl rubber according to the invention has an isoprene content of 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 2.0 or from 1.5 to 2.5 mol-% or of from 2.5 to 4.5 mol-% or from 4.5 to 8.5 mol-%.

In another embodiment the isoprene content of butyl rubbers according to the invention is 0.001 mol-% or more, preferably of from 0.001 mol-% to 3 mol-%, preferably 0.8 mol-% to 3 mol-% In one embodiment the weight average molecular weight of the butyl rubber according to the invention is in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol. Molecular weights are obtained using gel permeation chromatography in tetrahydrofuran (THF) solution using polystyrene molecular weight standards if not mentioned otherwise.

In one embodiment the polydispersity of the butyl rubber according to the invention according to the invention is in the range of 1.5 to 4.5 as measured by the ratio of weight average molecular weight to number average molecular weight as determined by gel permeation chromatography, preferably in the range of 2.5 to 3.5.

The butyl rubber according to the invention for example and typically has a Mooney viscosity of at least 10 (ML 1+8 at 125° C., ASTM D 1646), preferably of from 10 to 80, more preferably of from 20 to 80 and even more preferably of from 25 to 60 (ML 1+8 at 125° C., ASTM D 1646). In one embodiment the butyl rubber according to the invention has an ash content measured according to ASTM D5667 of 0.25 wt.-% or less, preferably 0.15 wt.-% or less, more preferably 0.10 wt.-% or less and even more preferably 0.05 wt.-% or less.

Rubber Products

One or more of the butyl rubbers according to the invention may be blended either with each other or additionally or alternatively with at least one secondary rubber, which is preferably selected from the group consisting of natural rubber (NR), epoxidized natural rubber (ENR), polyisoprene rubber, polyisobutylene rubber, poly(styrene-co-butadiene) rubber (SBR), chloroprene rubber (CR), polybutadiene rubber (BR), perfluoroelastomer (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), ethylene-propylene rubber (EPR), ethylene-propylene-diene M-class rubber (EPDM), polyphenylensulfide, nitrile-butadiene rubber (NBR), hydrogenated nitrile-butadiene rubber (HNBR), propylene oxide polymers, star-branched butyl rubber and halogenated star-branched butyl rubber, butyl rubbers which are not subject of the present invention i.e. having i.a. different levels of multivalent metal ions or purity grages, brominated butyl rubber and chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-alpha-methylstyrene), halogenated poly(isobutylene-co-isoprene-co-a-methylstyrene).

One or more of the butyl rubbers according to the invention or their blends with secondary rubbers described above may be further blended additionally or alternatively for example simultaneously or separately with at least one thermoplastic polymer, which is preferably selected from the group consisting of polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

The butyl rubbers according to the invention or their blends with secondary rubbers and/or thermoplastic polymers described may either comprise other components typically used in rubber industry such as fillers and curing agents or not. They are typically compounded with one or more fillers and all of them are hereinafter collectively referred to as rubber products.

Applications

The rubber products according to the invention are highly useful in wide variety of applications. The low degree of permeability to gases, the unsaturation sites which may serve as crosslinking, curing or post polymerization modification site as well as their low degree of disturbing additives accounts for the largest uses of these rubber products.

Therefore, the invention also encompasses the use of the rubber products according to the invention for innerliners, bladders, tubes, air cushions, pneumatic springs, air bellows, accumulator bags, hoses, conveyor belts and pharmaceutical closures. The invention further encompasses the aforementioned products comprising the rubber products according to the invention whether cured or/uncured.

The rubber products according to the invention further exhibit high damping and have uniquely broad damping and shock absorption ranges in both temperature and frequency.

Therefore, the invention also encompasses the use of the rubber products according to the invention according to the invention in automobile suspension bumpers, auto exhaust hangers, body mounts and shoe soles.

The rubber products of the instant invention are also useful in tire sidewalls and tread compounds. In sidewalls, the butyl rubber characteristics impart good ozone resistance, crack cut growth, and appearance.

The rubber products according to the invention may be shaped into a desired article prior to curing. Articles comprising the cured butyl rubbers according to the invention include, for example, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, etc.; a container closure or lid; a seal or sealant, such as a gasket or caulking; a material handling apparatus, such as an auger or conveyor belt; power belts, a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

The invention is hereinafter further explained by the examples without being limited thereto.

EXPERIMENTAL SECTION

X.1 Batch Polymerizations

Polymerizations were performed in a MBraun MB-200G glove box equipped with a pentane cooling bath, a reactor and bath temperature recorder. Isoprene (>99%) was purchased from Sigma-Aldrich and further purified by drying over $CaH_2$ for 24 hours under a nitrogen atmosphere and distilled over $CaH_2$ under nitrogen into an oven dried receiving flask prior to being transferred into the glove box where it was stored at −2° C. until use. Methyl tert-butyl ether (MTBE, anhydrous, 99.8%) was dried over 3 A molecular sieves prior to use. $AlCl_3$ (99.99%) was purchased from Sigma Aldrich and used as received.

Example 1 $AlCl_3$: Initiator Solution Preparation

A fresh $AlCl_3$ initiator solution was prepared each day and used for all experiment performed during that day. In the glove box, a 100 mL Erlenmeyer flask was charged with $AlCl_3$ (0.30 g, 2.25 mmol) was dissolved in MeCl (100 mL)

and cooled to −30° C. The solution was stirred using a mechanical stirrer at 450 rpm for 30 minutes at −30° C. The stirring was stopped, the flask was sealed, and the solution was cooled to −95° C. until use.

Example 2: General Slurry Polymerization Procedure

A 500 mL stainless steel beaker equipped with a temperature probe was placed in a pentane bath cooled to −95° C. and charged with pre-chilled Methyl Chloride (MeCl, 180 mL). Isobutene (20 mL, 14.24 g, 25.0 mmol) was condensed as a liquid into pre-chilled graduated cylinders and transferred to the reaction flask. Isoprene (0.8 mL, 0.54 g, 7.92 mmol) was transferred to the reaction via pipette. The solution was mechanically stirred at 800 rpm until the temperature had stabilized. Previously prepared $AlCl_3$ initiator solution (3 mL, 0.0090 g, 0.0675 mmol) was transferred to the reaction via a pre-chilled pipette to initiate the reaction. The polymerization was stirred for 5 minutes at 800 rpm, unless otherwise noted. The polymerization was stopped by the addition of an ethanol solution of NaOH (1.0 mL, 1 wt %, 0.01 mmol). The polymer cement was removed from the glove box, diluted with hexanes (ca. 300 mL) and anti-oxidant (1.0 mL, 1 wt % Irganox 1076 in hexanes) and left to stand in the fumehood overnight to remove volatiles. The cement was coagulated with ethanol (ca. 500-1000 mL) and the resulting polymer (7.9800 g, 53.7%) was collected and dried in a vacuum oven at 60° C. for 48 hours. Conversion was determined by gravimetric analysis. Initiator efficiency was calculated at 887 g polymer/g $AlCl_3$. The results are shown in TABLE 1.

TABLE 1

Slurry polymerizations without MTBE

| Run (for comparison) | Conversion (%) | Efficiency (g polymer/ g AlCl3) |
|---|---|---|
| 1 | 41.3 | 681 |
| 2 | 52.2 | 862 |
| 3 | 50.7 | 837 |
| 4 | 48.2 | 796 |
| 5 | 53.8 | 889 |
| 6 | 57.9 | 957 |
| 7 | 36.9 | 609 |
| 8 | 36.6 | 813 |
| 9 | 36.9 | 819 |
| 10 | 38.8 | 861 |
| 11 | 30.8 | 683 |

TABLE 1-continued

Slurry polymerizations without MTBE

| Run (for comparison) | Conversion (%) | Efficiency (g polymer/ g AlCl3) |
|---|---|---|
| 12 | 68.0 | 631 |
| 13 | 69.6 | 646 |
| 14 | 57.4 | 836 |
| 15 | 54.4 | 792 |
| 16 | 74.4 | 614 |
| 17 | 72.6 | 599 |

Example 3: MTBE Solution Preparation

A 100 mL Erlenmeyer flask held into a pentane bath cooled to −95° C., and charged with pre-chilled MeCl (100 mL). Methyl tert-butyl ether (MTBE, 5 □L, 0.0037 g, 0.042 mmol) was transferred to the flask via micropipette. The flask was stirred to disperse the MTBE into the MeCl, then sealed and the solution stored at −95° C. until use.

Example 4: Slurry Polymerizations with MTBE Added to the Reactor

A 500 mL stainless steel beaker equipped with a temperature probe was placed in a pentane bath cooled to −95° C. and charged with pre-chilled MeCl (180 mL). Isobutene (20 mL, 14.24 g, 25.0 mmol) was condensed as a liquid into pre-chilled graduated cylinders and transferred to the reaction flask. Isoprene (0.8 mL, 0.54 g, 7.92 mmol) was transferred to the reaction via pipette. A portion of the previously prepared MTBE solution was transferred to the reaction flask via a pre-chilled pipette. The amounts of MTBE added are shown in TABLE 2. The solution was mechanically stirred at 800 rpm until the temperature had stabilized. Previously prepared $AlCl_3$ initiator solution (3 mL, 0.0090 g, 0.0675 mmol) was transferred to the reaction via a pre-chilled pipette to initiate the reaction. The polymerization was stirred for 5 minutes at 800 rpm, unless otherwise noted. The polymerization was stopped by the addition of an ethanol solution of NaOH (1.0 mL, 1 wt %, 0.01 mmol). The polymer cement was removed from the glove box, diluted with hexanes (ca. 300 mL) and anti-oxidant (1.0 mL, 1 wt % Irganox 1076 in hexanes) and left to stand in the fumehood overnight to remove volatiles. The cement was coagulated with ethanol (ca. 500-1000 mL) and the resulting polymer was collected and dried in a vacuum oven at 60 °C for 48 hours. Conversion was determined by gravimetric analysis. The results are shown in Table 2.

TABLE 2

Slurry polymerizations with MTBE added to the reactor

| Run | MTBE (uL) | MTBE (g) | MTBE (moles) | MTBE:AlCl3 molar ratio | Conversion (%) | Efficiency (g polymer/g AlCl3) |
|---|---|---|---|---|---|---|
| 18 | 0.025 | 0.00002 | 2.0998E-07 | 0.005 | 70.8 | 1062 |
| 19 | 0.050 | 0.00004 | 4.1997E-07 | 0.01 | 79.1 | 1187 |
| 20 | 0.150 | 0.00011 | 1.2599E-06 | 0.02 | 83.8 | 1256 |
| 21 | 0.300 | 0.00022 | 2.5198E-06 | 0.03 | 84.6 | 1268 |
| 22 | 0.450 | 0.00033 | 3.7797E-06 | 0.05 | 84.9 | 1274 |
| 23 | 0.600 | 0.00044 | 5.0396E-06 | 0.07 | 87.5 | 1312 |
| 24 | 0.750 | 0.00056 | 6.2995E-06 | 0.08 | 84.8 | 1272 |
| 25 | 1.000 | 0.00074 | 8.3993E-06 | 0.11 | 85.4 | 1281 |

Example 5: Slurry Polymerizations with MTBE Added to the Initiator

A portion of the previously prepared $AlCl_3$ initiator solution (20 mL, 0.06 g, 0.45 mmol) was transferred to a new 100 mL Erlenmeyer flask, and held at to −95° C. in a cooled pentane bath. Methyl tert-butyl ether (MTBE, 4 DL, 0.0029 g, 0.034 mmol) was transferred to the flask via micropipette. The flask was stirred to disperse the MTBE into the initiator solution, then sealed and the solution stored at −95° C. until use.

A 500 mL stainless steel beaker equipped with a temperature probe was placed in a pentane bath cooled to −95° C. and charged with pre-chilled Methyl Chloride (MeCl, 180 mL). Isobutene (20 mL, 14.24 g, 25.0 mmol) was condensed as a liquid into pre-chilled graduated cylinders and transferred to the reaction flask. Isoprene (0.8 mL, 0.54 g, 7.92 mmol) was transferred to the reaction via pipette. The solution was mechanically stirred at 800 rpm until the temperature had stabilized. Previously prepared $AlCl_3$ initiator solution containing MTBE (3 mL, $AlCl_{3=0.0090}$ g, 0.0675 mmol; MTBE=0.0004 g, 0.0050 mmol) was transferred to the reaction via a pre-chilled pipette to initiate the reaction. The polymerization was stirred for 5 minutes at 800 rpm, unless otherwise noted. The polymerization was stopped by the addition of an ethanol solution of NaOH (1.0 mL, 1 wt %, 0.01 mmol). The polymer cement was removed from the glove box, diluted with hexanes (ca. 300 mL) and anti-oxidant (1.0 mL, 1 wt % Irganox 1076 in hexanes) and left to stand in the fumehood overnight to remove volatiles. The cement was coagulated with ethanol (ca. 500-1000 mL) and the resulting polymer (12.3520 g, 83.2%) was collected and dried in a vacuum oven at 60 °C for 48 hours. Conversion was determined by gravimetric analysis. Initiator efficiency was calculated at 1287 g polymer/g $AlCl_3$. The results are shown in TABLE 3.

TABLE 3

Slurry polymerizations with initiator system comprising MTBE

| Run | MTBE (uL) | MTBE (g) | MTBE (moles) | MTBE:$AlCl_3$ molar ratio | Conv. (%) | Efficiency (g polymer/ g $AlCl_3$) | Mw (g/mol) |
|---|---|---|---|---|---|---|---|
| 26 | 0.050 | 0.00004 | 4.1997E−07 | 0.01 | 81.8 | 1227 | 626259 |
| 27 | 0.150 | 0.00011 | 1.2599E−06 | 0.02 | 85.1 | 1276 | 563055 |
| 28 | 0.300 | 0.00022 | 2.5198E−06 | 0.03 | 81.5 | 1222 | 463035 |
| 29 | 0.450 | 0.00033 | 3.7797E−06 | 0.05 | 86.2 | 1293 | 463696 |
| 30 | 0.600 | 0.00044 | 5.0396E−06 | 0.07 | 83.7 | 1256 | 448724 |
| 31 | 0.750 | 0.00056 | 6.2995E−06 | 0.08 | 81.4 | 1222 | 423516 |
| 32 | 1.000 | 0.00074 | 8.3993E−06 | 0.11 | 83.3 | 1249 | 439745 |
| 33 | 1.688 | 0.00125 | 1.4174E−05 | 0.19 | 75.1 | 1093 | 424494 |

X.2 Polymer Analysis

Polymerizations were monitored using a digital thermocouple to track temperature changes. NMR spectroscopic analysis was carried out using a Bruker 500 MHz NMR spectrometer using solutions of polymer in $CDCl_3$ with concentrations of ca. 5 mg/mL. A delay time of 10 seconds was used to collect 32 transients with a pulse angle of 90°. Chemical shifts are reported in ppm for 1H spectra relative to tetramethylsilane (TMS) (☐=0).

Further experiments were carried out to obtain the required structural features to obtain the desired benefits. Experiments were performed as above, but with variation of the ether component. It was found that in order to realize peak initiator efficiency, a tertiary-alkyl group was required. The results of initiator efficiency are given in TABLE 4:

TABLE 4

Slurry polymerizations with initiator system comprising different ethers

| Ether | g polymer/ g $AlCl_3$ |
|---|---|
| Control (no ether) | 876 |
| Methyl tert-butyl ether (MTBE) | 1264 |
| Ethyl tert-butyl ether (ETBE) | 1283 |
| Methyl sec-butyl ether (MSBE) | 847 |
| Dipropyl ether (DPE) | 954 |
| Methyl tert-amyl ether (MTAE) | 1338 |

X.3—Continuous Polymerizations

Example 6

In an experiment to demonstrate the ability of tertiary alkyl ethers to benefit a continuous cationic polymerization of isobutylene-isoprene rubber, the following experiments were carried out.

A polymerization feedstock (Stream 1) was prepared consisting of 62% methyl chloride, 37% isobutylene, 1% isoprene, and 10 ppm MTBE and was cooled to approximately −100° C. An initiator solution (Stream 2) of aluminum trichloride (~0.2 wt %) and water (trace) in methyl chloride was prepared separately and was similarly cooled to ~−100° C. Streams 1 and 2 were fed continuously to a steel reaction vessel which was also cooled to ~−100° C., said vessel being equipped with an agitator and a temperature probe. Upon contact of the two streams in the agitated vessel, the monomers reacted to create isobutylene-isoprene rubber with a yield of between 60 and 90% as measured by mass of polymer produced vs mass of isobutene injected. The contents of the agitated reaction vessel were allowed to continuously overflow into a second vessel, wherein the remaining active initiator species from Stream 2 were neutralized with sodium hydroxide. The ratio between streams 1 and 2 was continually adjusted in response to temperature changes within the cooled reaction vessel, with the aim of maintaining temperature between −100° C. and −85° C. The second vessel was periodically sampled for later analysis. After stream 1 was depleted, the experiment was halted and the neutralized samples were devolatilized and analyzed.

A control experiment was performed as above, however with the omission of MTBE.

In this way it was demonstrated that in the presence of MTBE it is possible to continuously form isoprene isobutylene elastomer using a fraction of the initiator solution typically required to form polymer. This is expressed in the table below as grams of AlCl₃ per gram of polymer produced:

| Sample | g polymer/ g AlCl₃ |
|---|---|
| Control T1 | 1386 |
| Control T2 | 1245 |
| Control T3 | 1306 |
| MTBE T1 | 3381 |
| MTBE T2 | 3553 |
| MTBE T3 | 3915 |

Analysis of the samples collected in both MTBE and control experiments revealed a number of distinct product advantages imparted from the use of MTBE. These advantages include a reduction in polydispersity of the product, a reduction in cyclic oligomer byproducts, and a reduction in the non-reactive 'branched' component of the in-chain unsaturation of the product. The results are given in TABLES 5 to 7.

TABLE 5

Reduction in molecular weight distribution as measured by polydispersity index

| Sample | Mn | Mw | Polydispersity |
|---|---|---|---|
| Control 1 | 167433 | 654448 | 3.91 |
| Control 2 | 146152 | 641169 | 4.39 |
| Control 3 | 159201 | 656921 | 4.13 |
| MTBE 1 | 227448 | 675115 | 2.97 |
| MTBE 2 | 241128 | 613962 | 2.55 |
| MTBE 3 | 204572 | 555522 | 2.72 |
| MTBE 4 | 182767 | 515347 | 2.82 |
| MTBE 5 | 170178 | 491620 | 2.89 |
| MTBE 6 | 175831 | 488686 | 2.78 |
| MTBE 7 | 176687 | 507678 | 2.87 |

TABLE 6

Reduction in $C_{13}H_{24}$ and $C_{21}H_{40}$ oligomers and $C_{21}/C_{13}$ oligomer ratio as measured by gas chromatography

| Sample | $C_{13}H_{24}$ | $C_{21}H_{40}$ | Ratio $C_{21}/C_{13}$ |
|---|---|---|---|
| Control 1 | 485 | 1423 | 2.93 |
| Control 2 | 483 | 1523 | 3.15 |
| Control 3 | 481 | 1404 | 2.92 |
| MTBE 1 | 218 | 365 | 1.67 |
| MTBE 2 | 224 | 275 | 1.23 |
| MTBE 3 | 237 | 321 | 1.36 |
| MTBE 4 | 278 | 421 | 1.51 |
| MTBE 5 | 272 | 444 | 1.64 |
| MTBE 6 | 276 | 452 | 1.64 |
| MTBE 7 | 240 | 439 | 1.82 |

TABLE 7

Reduction in the relative contribution of branched unsaturation (unreactive) to total unsaturation

| Sample | % 1,4 isoprene | % branched | % Total Unsats | % Branched/ total |
|---|---|---|---|---|
| Control 1 | 1.61 | 0.13 | 1.74 | 7.5 |
| Control 2 | 1.59 | 0.13 | 1.72 | 7.6 |
| Control 3 | 1.62 | 0.13 | 1.74 | 7.5 |
| MTBE 1 | 1.55 | 0.10 | 1.65 | 6.1 |
| MTBE 2 | 1.60 | 0.10 | 1.69 | 5.9 |
| MTBE 3 | 1.70 | 0.11 | 1.81 | 6.1 |
| MTBE 4 | 1.69 | 0.10 | 1.79 | 5.6 |
| MTBE 5 | 1.71 | 0.12 | 1.82 | 6.6 |
| MTBE 6 | 1.70 | 0.12 | 1.81 | 6.6 |
| MTBE 7 | 1.66 | 0.11 | 1.77 | 6.2 |

What is claimed is:

1. A process for the preparation of isoolefin polymers, the process comprising the step of:
   a) providing a reaction medium comprising an organic diluent, at least one monomer being an isoolefin and an initiator system comprising
      at least one aluminium compound and
      at least one tertiary ether, wherein a molar ratio of the at least one tertiary ether to a sum of aluminum atoms of the at least one aluminum compound is from 0.001 to 0.200;
   and
   b) polymerizing the at least one monomer within the reaction medium in the presence of the initiator system at a temperature from −100° C. to −60° C. to form a product medium comprising the isoolefin polymer, the organic diluent and optionally residual monomer(s).

2. The process according to claim 1, wherein the isoolefin is isobutene.

3. The process according to claim 1, wherein the reaction medium further comprises one or more multiolefins.

4. The process according to claim 3, wherein the multiolefin includes isoprene, butadiene, 2,4-dimethylbutadiene, piperylene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene, or mixtures of the aforementioned.

5. The process according to claim 3, wherein the multiolefin is isoprene.

6. The process according to claim 1, wherein the reaction medium further comprises monomers that are copolymerized with the at least one isoolefin and are neither isoolefins nor multiolefins.

7. The process according to claim 1, wherein the diluents include hydrochlorocarbon(s), hydrofluorocarbons represented by the formula: $C_xH_yF_z$ wherein x is an integer from 1 to 40 and wherein y and z are integers and at least one, unsaturated hydrofluorocarbons, or hydrocarbons.

8. The process according to claim 1, wherein the aluminium compounds are those represented by formula $MX_3$, where M is aluminum and X is a halogen, or those represented by formula $MR_{(m)}X_{(3-m)}$, where M is aluminum, X is a halogen, R is a monovalent hydrocarbon radical selected from the group consisting of $C_1$-$C_{12}$ alkyl and $C_7$-$C_{14}$ alkylaryl radicals; and m is one or two.

9. The process according to claim 1, wherein the tertiary ethers are methyl tert.-butyl ether (MTBE), ethyl tert.-butyl ether (ETBE), methyl tert.-amyl ether (MTAE) and phenyl tert.-butyl ether (PTBE) or mixtures thereof;

optionally, wherein the tertiary ethers includes or consists of methyl tert.-butyl ether (MTBE).

10. The process according to claim 1, wherein the isoolefin polymer comprises a polydispersity, as measured by the ratio of weight average molecular weight to number average molecular weight as determined by gel permeation chromatography, of 1.5 to 4.5.

11. The process according to claim 1, wherein the process further comprises forming the isoolefin polymer into a rubber product and optionally curing the rubber product.

12. A rubber product prepared according to the process of claim 11.

13. The process according to claim 1, wherein the process further comprises blending the isoolefin polymer with at least one secondary rubber.

14. A composition including a blend of an isoolefin polymer and at least one secondary rubber prepared according to the process of claim 13.

15. An isoolefin polymer prepared according to the process of claim 1.

16. A process for the preparation of isoolefin polymers, the process comprising the step of:
    a) providing a reaction medium comprising an organic diluent, at least one monomer being an isoolefin, isoprene and an initiator system comprising
        at least one boron or aluminium compound and
        at least one tertiary ether
    and
    b) polymerizing the at least one monomer within the reaction medium in the presence of the initiator system to form a product medium comprising the isoolefin polymer and the isoprene, the organic diluent and optionally residual monomer(s);
    wherein the isoolefin polymer comprises a molar ratio of 1,4-isoprene structures to branched unsaturated structures of 14.0 to 20.0 and is characterized by a weight average molecular weight from 350 kg/mol to 1,000 kg/mol;
    optionally, wherein the isoolefin polymer is characterized by a molar ratio of 1,4-isoprene structures to branched unsaturated structures that is 14.0 to 17.0.

17. The process according to claim 16, wherein the isoolefin polymer comprises C13 and C21 structures in an amount of less than 800 ppm.

18. The process of claim 16, wherein
    the at least one tertiary ether includes a tertiary ether having at least one tertiary alkyl group or at least one tertiary arylalkyl group; and/or
    the step of polymerizing is at a temperature of −100° C. to −60° C.

19. A process for the preparation of isoolefin polymers, the process comprising the step of:
    a) providing a reaction medium comprising an organic diluent, at least one monomer being an isoolefin and an initiator system comprising
        at least aluminium compound and
        at least one tertiary ether
    and
    b) polymerizing the at least one monomer within the reaction medium in the presence of the initiator system to form a product medium comprising the isoolefin polymer, the organic diluent and optionally residual monomer(s);
    wherein the isoolefin polymer comprises a weight ratio of C21 to C13 of from 0.9 to 2.0 and is characterized by a polydispersity, as measured by the ratio of weight average molecular weight to number average molecular weight as determined by gel permeation chromatography, of 1.5 to 4.5.

20. The process of claim 19, wherein
    the at least one tertiary ether includes a tertiary ether having at least one tertiary alkyl group or at least one tertiary arylalkyl group; and/or
    the step of polymerizing is at a temperature of −100° C. to −60° C.

* * * * *